United States Patent [19]

Polak et al.

[11] Patent Number: 4,500,667

[45] Date of Patent: Feb. 19, 1985

[54] POLYMER BLENDED MEMBRANES

[75] Inventors: Anthony J. Polak, Lake Zurich; Allyson J. Beuhler, Indian Head Park, both of Ill.

[73] Assignee: UOP Inc., Des Plaines, Ill.

[21] Appl. No.: 545,704

[22] Filed: Oct. 26, 1983

[51] Int. Cl.³ .................................................. C08K 3/10
[52] U.S. Cl. .................................... 524/406; 524/413; 524/557; 524/41
[58] Field of Search ............... 524/406, 413, 417, 557, 524/560, 41

[56] References Cited

U.S. PATENT DOCUMENTS 4,024,036  5/1977  Nakamura et al. ................. 204/129

Primary Examiner—Joseph L. Schofer
Assistant Examiner—J. M. Reddick
Attorney, Agent, or Firm—William H. Page, II; Raymond H. Nelson

[57] ABSTRACT

Gas separation membranes comprising an organic polymer-inorganic compound blend may be prepared by admixing an organic polymer such as poly(vinyl alcohol) with a heteropoly acid or salt thereof such as dodecamolybdophosphoric acid in a mutually miscible solvent. After allowing the mixture to react for a period of time sufficient to form a blend, the solution may be cast on an appropriate casting surface and, after the solvent has been evaporated, the desired membrane which may have a thickness of from about 1 to about 50 microns is recovered.

7 Claims, No Drawings

POLYMER BLENDED MEMBRANES

BACKGROUND OF THE INVENTION

Semipermeable membranes may be used for a wide variety of separations involving liquid-liquid separations, liquid-liquid solid separations and gas-gas separations. The membranes which are employed for these purposes usually comprise various organic polymers or mixtures of organic polymers either alone or supported on a porous backing material. For example, semipermeable membranes which are used in desalination processes can comprise cellulose acetate polymers composited on a porous support which acts as a backing for the membrane, thin film composite membranes comprising polymeric compounds such as polyethyleneimine, epiamine, polyethylene, polypropylene films also composited on a porous support such as a polysulfone member, etc. Likewise, gaseous separation membranes may comprise polymeric membranes of cellulose nitrate or cellulose acetate support membranes having a polymer such as dimethylsilicone, styrene, silicon-carbide copolymers composited thereon, as well as thin film membranes such as polymethylpentene polymers. In addition to these membranes other permselective membranes such as heteropoly acids may be employed for separating gases such as hydrogen from mixtures of gases in a gaseous stream.

In a majority of cases, the admixture of an organic compound, especially in a polymeric state, with an inorganic compound, results in a phase separation, the two systems being immiscible in nature. However, we have now discovered that a polymer blended membrane may be fabricated by admixing a heteropoly acid or a salt thereof with an organic polymer which is at least partially compatible with said heteropoly acid or salt to form a polymer blended composition of matter which may be utilized as a membrane in a gas separation process. It was totally unexpected that a thin film membrane could be cast from such a blend to provide a membrane which would be highly selective to certain gases and therefore find a use in such separations involving a gas such as hydrogen.

BRIEF SUMMARY OF THE INVENTION

This invention relates to compositions of matter which may be used as gas separation membranes. More specifically, the invention is concerned with a novel thin film organic-inorganic membrane which is used in gas separation processes.

A conventional operation for separating certain gases from a gas stream containing a mixture of gases whereby a desired gas may be separated and recovered involves the use of membranes which possess a high permeability to the molecular form of the desired gas such as oxygen, hydrogen, nitrogen, etc. These membranes, especially in the case of hydrogen, possess a high permeability to hydrogen whereby molecular hydrogen is transported from the high pressure side of the device, through the membrane and emerges as molecular hydrogen on the low pressure side. Alternatively, separation of gases may be attained by dissociating the desired gas on the high pressure side and transporting it as an ion through the membrane followed by recombining the ions on the low pressure side. Therefore, a desirable membrane for hydrogen separation should possess excellent protonic conductivity properties. As will hereinafter be shown in greater detail, we have now discovered that membranes which contain both organic and inorganic components will possess this desired property and therefore may be used as hydrogen sensors, hydrogen separation devices, as well as a solid state thin film electrolyte.

It is therefore an object of this invention to provide novel polymeric membranes which are useful in gas separation devices.

A further object of this invention is to provide a method for preparing organic-inorganic membranes of a type hereinafter set forth in greater detail, said membranes being utilized in gas separation devices.

In one aspect an embodiment of this invention resides in a thin film organic-inorganic membrane which comprises a blend of a compound selected from the group consisting of heteropoly acids and salts thereof and a polymer which is at least partially compatible with said compound.

Another embodiment of this invention is found in a method for the preparation of a thin film organic-inorganic membrane which comprises dissolving a compound selected from the group consisting of heteropoly acids and salts thereof and a polymer which is at least partially compatible with said compound in a mutually miscible solvent at reaction conditions for a period of time sufficient to form a blend, casting said blend on a casting surface, removing said solvent and recovering the resultant thin film membrane.

A specific embodiment of this invention resides in a thin film organic-inorganic membrane which comprises a blend of poly(vinyl alcohol) and dodecamolybdophosphoric acid, said polymer being present in an amount in the range of from about 90% to about 30% by weight of said blend and said acid being present in an amount in the range of from about 10% to about 70% by weight of said blend.

Another specific embodiment of this invention is found in a method for the preparation of a thin film organic-inorganic membrane which comprises dissolving dodecamolybdophosphoric acid and poly(vinyl alcohol) in water at a temperature in the range of from about ambient to about 100° C for a period of time sufficient to form a blend, casting said blend on a casting surface, removing said water by evaporation, and recovering the resultant thin film membrane.

Other objects and embodiments will be found in the following further detailed description of the present invention.

DETAILED DESCRIPTION OF THE INVENTION

As hereinbefore set forth, the present invention is concerned with polymer blended membranes comprising a thin film organic-inorganic blend and to a method for the preparation thereof. As was previously discussed, when attempting to blend an organic polymer with an inorganic compound, the usual result is to obtain a phase separation. In contradistinction to this, we have now discovered that a single phase system may be obtained by admixing certain organic polymeric compounds with a heteropoly acid or salt thereof, the resulting composition of matter forming a thin film membrane which may be utilized in gas separation systems. The use of these membranes in gas separation devices is due in some respect to the fact that heteropoly acids or salts thereof possess a high protonic conductivity, especially at room or ambient temperature. The membranes which are formed from the blend of the organic polymer and the heteropoly acid or salt thereof possess excellent transport properties as well as an increase in tensile strength over those membranes prepared from pure organic polymers. The physical properties which these thin film membranes exhibit thus provide an attractive base for their use as gas sensors, especially in the case of hydrogen, or as gas separation membranes. As will hereinafter be shown in greater detail, the organic-inorganic blends possess chemical, mechanical and electrical properties which indicate the two materials form a single phase system. For example, the blends possess only one glass transition temperature which indicates a single phase system inasmuch as, if the resulting membranes were a two-phase system, or merely a physical mixture, the composition would possess two separate and distinct glass transition temperatures. In addition, the yield strength and modulus is greatly increased over those properties which are possessed by either of the two components. Another physical characteristic which indicates a single phase or true composition of matter is that the blend is transparent to visible light as well as being uniform in color.

The desired membrane comprises a blend of an organic polymer and a heteropoly acid or salt thereof, the polymer being at least partially compatible with the acid or salt. Examples of organic polymers which may be employed as one component of the blend of the present invention include poly(vinyl alcohol), poly(vinyl fluoride), polyethylene oxide, polyethyleneimine, polyacrylic acid, polyethylene glycol, cellulose acetate, polyvinylmethylethyl ether, phenol formaldehyde resins, etc.

Examples of heteropoly acids or salts thereof which may be employed as the second component of the organic-inorganic blend which may be used to form a membrane will possess the generic formula:

$$A_m[X_xY_yO_z] \cdot n\ H_2O$$

in which X and Y may be selected from the group consisting of boron, aluminum, gallium, silicon, germanium, tin, phosphorus, arsenic, antimony, bismuth, selenium, tellurium, iodine, and the first, second, third and fourth transitional metal series, said series including scandium, yttrium, lanthanum, actinium, titanium, zirconium, hafnium, vanadium, niobium, tantalum, chromium, molybdenum and tungsten, X and Y being dissimilar in nature, Y being at least one metal selected from the first, second, third or fourth transition metal series above named, A is selected from the group consisting of hydrogen, ammonium, sodium, potassium, lithium, rubidium, cesium, beryllium, magnesium, calcium, strontium and barium, m is an integer of from 1 to 10, y is an integer of from 6 to 12 based on x taken as 1, z is an integer of from 30 to 80 and n is an integer of from 3 to 100.

Specific examples of these compounds will include dodecamolybdophosphoric acid, ammonium molybdophosphate, sodium molybdophosphate, potassium molybdophosphate, lithium molybdophosphate, calcium molybdophosphate, magnesium molybdophosphate, dodecatungstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, etc. It is also contemplated within the scope of this invention that some uranyl compounds may also be employed as the heteropoly acid or salt thereof. These uranyl compounds will possess the generic formula:

$$A[UO_2]XO_4 \cdot n\ H_2O$$

in which A is selected from the group consisting of hydrogen, lithium, sodium, potassium, ammonium, copper, magnesium, calcium, barium, strontium, lead, iron, cobalt, nickel, manganese, and aluminum, X is selected from the group consisting of phosphorus and arsenic and n is an integer of from 1 to 4. Some specific examples of these uranyl compounds will include uranyl orthophosphate, uranyl orthoarsenate, lithium uranylphosphate, lithium uranylarsenate, sodium uranylphosphate, sodium uranylarsenate, potassium uranylphosphate, potassium uranylarsenate, ammonium uranylphosphate, ammonium uranylarsenate, calcium uranylphosphate, calcium uranylarsenate, barium uranylphosphate, barium uranylarsenate, copper uranylphosphate, copper uranylarsenate, iron uranylphosphate, iron uranylarsenate, cobalt uranylphosphate, cobalt uranylarsenate, nickel uranylphosphate, nickel uranylarsenate, etc.

It is to be understood that the aforementioned listing of organic polymeric compounds, heteropoly acids or salts thereof are only representative of the class of compounds which may be employed in formulating the organic-inorganic blends of the present invention, and that this invention is not necessarily limited thereto.

The novel compositions of matter of the present invention are prepared by admixing the two components of the blend in a mutually miscible solvent at solution conditions for a period of time sufficient to form the desired blend. In the preferred embodiment of the invention the mutually miscible solvent which is employed to dissolve the components comprises water, although it is contemplated within the scope of this invention that any other mutually miscible solvent, either inorganic or organic in nature may also be employed. The mixing of the two components of the composition of matter may be effected at solution conditions which will include a temperature in the range of from about ambient (20°–25° C.) up to the boiling point of the mutually miscible solvent which, for example, in the case of water is 100° C. The time of reaction which is necessary to form the desired blend will vary with the particular organic polymers and heteropoly acids or salts thereof as well as the solvent and may be within a period of time ranging from about 0.5 up to about 10 hours or more in duration. Upon completion of the reaction period, the blend is cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaporation by the application of elevated temperatures whereby said solvent is evaporated and the desired membrane comprising a thin film of the polymeric blend is formed. In the preferred embodiment of the invention, the polymeric blend of an organic-inorganic compound will possess a molecular weight ranging from about 2000 up to about 135,000 and preferably greater than 10,000. The thickness of the film can be controlled by the amount of heteropoly acid or salt thereof and/or the polymer which is present in the reaction mixture. In this respect, it is to be noted that the ratio of heteropoly acid or salt and organic polymer may vary over a relatively wide range. For example, the heteropoly acid or salt may be present in the blend in a range of from about 10% to about 70% by weight of the blend while the organic polymer may be present in an amount in the range of from about 90% to about 30% by weight of the blend. The thin film organic-inorganic blend which is prepared according to the process of the present invention will possess a thickness which may range from about 0.1 to about 50 microns and preferably from about 5 to about 20 microns.

The polymer blend membranes of the present invention may be prepared by placing a predetermined amount of each of the components of the blend, namely, the organic polymer and the heteropoly acid or salt thereof, in an appropriate apparatus such as a flask. After adding the mutually miscible solvent, the mixture is allowed to remain, after thorough admixing thereof, for a predetermined period of time within the range hereinbefore set forth. As an example, poly(vinyl alcohol) and dodecamolybdophosphoric acid may be placed in a flask and dissolved in water which has been heated to 100° C. Upon completion of the desired residence time, the solution is cast upon an appropriate casting surface and the water or other solvent is removed. The desired and resulting polymer blend membrane is then recovered and utilized in an appropriate gas separation apparatus or gas sensor apparatus.

Examples of novel thin film organic-inorganic polymer blends which may be prepared according to the process of this invention will include poly(vinyl alcohol)-dodecamolybdophosphoric acid, poly(vinyl fluoride)-dodecamolybdophosphoric acid, cellulose acetate-dodecamolybdophosphoric acid, polyethylene oxide-dodecamolybdophosphoric acid, polyethylene glycol-dodecamolybdophosphoric acid, poly(vinyl alcohol)dodecatungstophosphoric acid, poly(vinyl fluoride)-dodecatungstophosphoric acid, cellulose acetate-dodecatungstophosphoric acid, polyethylene oxide-dodecatungstophosphoric acid, polyethylene glycol-dodecatungstophosphoric acid, poly(vinyl alcohol)-dodecamolybdosilicic acid, poly(vinyl fluoride)-dodecamolybdosilicic acid, cellulose acetate-dodecamolybdosilicic acid, polyethylene oxide-dodecamolybdosilicic acid, polyethylene glycol-dodecamolybdosilicic acid, poly(vinyl alcohol)ammonium molybdophosphate, poly(vinyl fluoride)-ammonium molybdophosphate, cellulose acetate-ammonium molybdophosphate, polyethylene oxideammonium molybdophosphate, polyethylene glycol-ammonium molybdophosphate, poly(vinyl alcohol)-uranyl orthophosphate, poly(vinyl fluoride)uranyl orthophosphate, cellulose acetate-uranyl orthophosphate, polyethylene oxide-uranyl orthophosphate, polyethylene glycol-uranyl orthophosphate, etc. It is to be understood that the aforementioned list of polymer blends is only representative of the class of polymer blend membranes which may be prepared according to the process of this invention and that said invention is not necessarily limited thereto.

The following examples are given for purposes of illustrating the novel polymer blends and processes of the present invention. However, it is to be understood that these examples are merely illustrative in nature and that the present process is not necessarily limited thereto.

EXAMPLE I

A novel polymer blend membrane was prepared by dissolving poly(vinyl alcohol) and dodecamolybdophosphoric acid in boiling deionized water, the amount of organic polymer and heteropoly acid being sufficient to impart a 50/50 weight percent ratio to the resulting polymer blend membrane. The solution was then poured into an evaporation dish and the water was allowed to evaporate for a period of 16 hours. The resulting blended film was yellow-green in color and possessed a thickness of 20 microns.

The thin film membrane was cut into a disc having a 1" diameter and electrodes were sputter-dispersed onto both sides of the disc. The electrode material which comprised platinum had a thickness ranging from about 100 to about 200 Angstroms with a diameter of about 1.2 cm. Following this, the film was placed into a Teflon holder and electrical contact was made to the electrodes through copper platens. On one side of the membrane, a hydrogen pressure of 1 atmosphere was maintained while exposing the working electrode to hydrogen, containing a sufficient amount of water in the form of water vapor so as to maintain a relative humidity of at least 30%, at a hydrogen partial pressure of 0.02 atmospheres. The results of this test showed a hydrogen flux of $1.46 \times 10^{-3}$ ft$^3$/ft$^2$-hr. and a current as measured in milliamps of $1.337 \times 10^{-1}$.

In addition, various analyses of the film were performed to determine whether or not the film was in single phase or two-phase. The blended film was found to be optically transparent, and no phase separation was observed when the film was examined with an optical microscope or SEM. The specimen was also subjected to a glass transition temperature measurement inasmuch as the measurement of the glass transition temperature, or temperatures of a polymer blend is the most commonly used criteria for determining the number of phases present in a blend. For example, a single phase organic-inorganic blend will exhibit a single glass transition temperature between the temperatures of the components, while in a two-phase system, two separate temperatures will result. Poly(vinyl alcohol) has a known glass transition temperature of about 71° C., while the melting point temperature of dodecamolybdophosphoric acid is about 84° C. A DSC scan of the film prepared according to the above paragraphs had a peak of 78° C. while no peaks were observed at temperatures corresponding to the glass transition temperatures of poly(vinyl alcohol) or the melting point of dodecamolybdophosphoric acid.

Infra-red spectroscopy of the film showed four strong bands appearing at 820 cm$^{-1}$, 885 cm$^{-1}$, 972 cm$^{-1}$, and 1075 cm$^{-1}$. The indication from this analysis is that the bands are associated with intermolecular bonding between the poly(vinyl alcohol) and the dodecamolybdophosphoric acid. In addition to these analyses, it was found that the blended film possessed increased tensile strength and modulus over that which is possessed by either poly(vinyl alcohol) or dodecamolybdophosphoric acid, the increase in tensile strength and modulus perhaps being the result of increased hydrogen bonding due to the formation of a single phase material.

EXAMPLE II

Additional organic polymer-heteropoly acid blend membranes were prepared utilizing a manner similar to that set forth in Example I above. The different membranes were prepared utilizing various poly(vinyl alcohol) (PVA)/dodecamolybdophosphoric acid (DMPA) loadings. The fabricated films contained loadings of 90% PVA/10% DMPA, 75% PVA/25% DMPA and 40% PVA/60% DMPA and were labeled A, B and C respectively. Each of the films possessed a thickness of about 20 microns and after recovery were cut into 1" diameter discs. The electrodes comprising platinum were sputter dispersed onto both sides of the disc to a thickness of about 100 Angstroms. The electrode-membrane composite was then utilized in a manner similar to that set forth in Example I above in a gas separation apparatus under a hydrogen partial pressure, obtained by mixing hydrogen, containing a sufficient amount of water in the form of water vapor so as to maintain a relative humidity of at least 30%, with either helium or nitrogen, of 0.02 atmospheres. The hydrogen flux through the blended membranes was effected at room temperature with the following results in which I(ma) is the current:

| MEMBRANE | I(ma) | FLUX (ft$^3$/ft$^2$-hr.) |
|---|---|---|
| A | $5 \times 10^{-4}$ | $5.6 \times 10^{-6}$ |
| B | $3.1 \times 10^{-2}$ | $3.39 \times 10^{-4}$ |
| C | $1.337 \times 10^{-1}$ | $1.46 \times 10^{-3}$ |

EXAMPLE III

In a manner similar to that set forth in Example I above, other organic-inorganic membranes may be prepared by blending poly(vinyl alcohol) with dodecatungstophosphoric acid, cellulose acetate and dodecamolybdophosphoric acid, poly(vinyl alcohol) and uranyl orthophosphate, and poly(vinyl alcohol) and ammonium phosphomolybdate. The resulting membranes may then be treated by sputter depositing platinum or palladium on both sides of said membrane to a thickness of from about 100 to about 200 Angstroms and the resulting composite utilized in a gas separation apparatus to separate hydrogen from a gas stream consisting of hydrogen and other inert gases such as helium or nitrogen.

We claim as our invention:

1. A thin film membrane which comprises a blend of: (1) from about 10% to about 70% by weight of a heteropoly acid and salts thereof having the generic formula:

$$A_m[X_xY_yO_z] \cdot nH_2O$$

in which X is selected from the group consisting of boron, aluminum, gallium, silicon, germanium, tin, phosphorus, arsenic, antimony, bismuth, selenium, tellurium, iodine, and metals of the first, second, third and fourth transitional metal series of the Periodic Table and where Y is dissimilar from X and is selected from at least one metal of the first, second, third and fourth transitional metal series of the Periodic Table. A is selected from the group consisting of hydrogen, ammonium, sodium, potassium, lithium, rubidium, cesium, beryllium, magnesium, calcium, strontium and barium. m is an integer of from about 1 to 10, y is an integer of from 6 to 12 based on x being equal to 1, z is an integer of from 30 to 80 and n is an integer of from 3 to 100 and, (2) from about 90% to about 30% by weight of a polymer compatible with said compound selected from the group consisting of poly (vinyl alcohol), poly(vinyl fluoride), polyethylene oxide, polyethyleneinine, polyvinylmethylethyl ether and phenol formaldehyde resins.

2. The membrane as set forth in claim 1 in which said membrane possesses a thickness of from about 0.1 to about 50 microns.

3. The membrane as set forth in claim 1 in which said polymer comprises poly(vinyl alcohol) and said heteropoly acid comprises dodecamolybdophosphoric acid.

4. The membrane as set forth in claim 1 in which said polymer comprises poly(vinyl alcohol) and said heteropoly acid comprises dodecatungstophosphoric acid.

5. The membrane as set forth in claim 1 in which said polymer comprises cellulose acetate and said heteropoly acid comprises dodecamolybdophosphoric acid.

6. The membrane as set forth in claim 1 in which said polymer comprises poly(vinyl alcohol) and said heteropoly salt comprises uranyl orthophosphate.

7. The membrane as set forth in claim 1 in which said polymer comprises poly(vinyl alcohol) and said heteropoly salt comprises ammonium phosphomolybdate.

* * * * *

UNITED STATES PATENT AND TRADEMARK OFFICE
CERTIFICATE OF CORRECTION

PATENT NO. : 4,500,667
DATED : February 19, 1985
INVENTOR(S) : Anthony J. Polak et al.

It is certified that error appears in the above-identified patent and that said Letters Patent is hereby corrected as shown below:

Column 8, line 31 after "polyethyleneimine" insert --polyacrylic acid, polyethylene glycol, cellulose acetate-- .

Signed and Sealed this

Thirtieth Day of July 1985

[SEAL]

Attest:

DONALD J. QUIGG

Attesting Officer    Acting Commissioner of Patents and Trademarks